United States Patent
Sanders (10) Patent No.: US 11,379,889 B2
(45) Date of Patent: Jul. 5, 2022

(54) PROVIDING CONTENT FROM MOBILE DEVICES TO PROXIMATE KIOSK COMPUTERS

(71) Applicant: HEWLETT-PACKARD DEVELOPMENT COMPANY, L.P., Houston, TX (US)

(72) Inventor: Aaron Sanders, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 825 days.

(21) Appl. No.: 16/081,306

(22) PCT Filed: Apr. 13, 2017

(86) PCT No.: PCT/US2017/027427
§ 371 (c)(1),
(2) Date: Aug. 30, 2018

(87) PCT Pub. No.: WO2018/190847
PCT Pub. Date: Oct. 18, 2018

(65) Prior Publication Data
US 2021/0201366 A1 Jul. 1, 2021

(51) Int. Cl.
*G06Q 30/02* (2012.01)
*H04W 4/23* (2018.01)
*H04W 4/80* (2018.01)
*H04W 4/02* (2018.01)
*H04B 17/318* (2015.01)

(52) U.S. Cl.
CPC ....... *G06Q 30/0281* (2013.01); *H04B 17/318* (2015.01); *H04W 4/023* (2013.01); *H04W 4/23* (2018.02); *H04W 4/80* (2018.02)

(58) Field of Classification Search
None
See application file for complete search history.

(56) References Cited

U.S. PATENT DOCUMENTS

| 8,656,316 B2 * | 2/2014 | Lazaridis | H04W 76/12 |
| | | | 715/810 |
| 9,129,314 B1 | 9/2015 | Boyle et al. | |
| 9,836,257 B2 * | 12/2017 | Chang | G06F 3/1228 |

(Continued)

FOREIGN PATENT DOCUMENTS

| KR | 20120128899 A | 11/2012 |
| WO | 2016040089 A1 | 3/2016 |

OTHER PUBLICATIONS

Hwangbo, "How Beacons Can Help Provide Personalized Customer Experiences", Retrieved from Internet: https://www.recode.net/sponsored/11896116/how-beacons-can-help-provide-personalized-customer-experiences, 2016, 6 Pages.

*Primary Examiner* — Gennadiy Tsvey
(74) *Attorney, Agent, or Firm* — Conley Rose PC (57) ABSTRACT

In at least some examples, a system comprises a first kiosk computer to display first content and to broadcast a first beacon signal, and a second kiosk computer to display second content and to broadcast a second beacon signal. A mobile device is to establish communications with the more proximate of the first and second kiosk computers as determined based on the first and second beacon signals and to cause new content to be provided to the more proximate kiosk computer. The more proximate kiosk computer is to display the new content.

12 Claims, 5 Drawing Sheets

(56) References Cited

U.S. PATENT DOCUMENTS

| | | | |
|---|---|---|---|
| 2010/0057563 A1* | 3/2010 | Rauber | H04N 21/64322 715/772 |
| 2010/0060549 A1* | 3/2010 | Tsern | G06F 3/0412 345/2.1 |
| 2011/0093339 A1 | 4/2011 | Morton | |
| 2011/0131520 A1* | 6/2011 | Al-Shaykh | H04N 21/43615 715/772 |
| 2014/0368411 A1* | 12/2014 | Tsukamoto | G09G 5/006 345/2.3 |
| 2015/0004903 A1 | 1/2015 | Lyman | |
| 2015/0186101 A1* | 7/2015 | Zhang | G06F 3/04817 345/173 |
| 2015/0346701 A1* | 12/2015 | Gordon | H04L 12/2809 700/275 |
| 2016/0048871 A1* | 2/2016 | Glass | G06Q 50/01 705/14.49 |
| 2016/0072915 A1* | 3/2016 | Decanne | G06F 16/24578 715/728 |
| 2016/0165395 A1 | 6/2016 | Long et al. | |
| 2016/0179454 A1* | 6/2016 | Liu | G06F 3/04842 715/747 |
| 2016/0179455 A1* | 6/2016 | Liu | G06Q 30/0269 345/2.2 |
| 2016/0180392 A1* | 6/2016 | Liu | G06Q 30/0251 705/14.53 |
| 2016/0182613 A1* | 6/2016 | Brune | H04W 4/80 709/217 |
| 2016/0275556 A1 | 9/2016 | Shanmugam et al. | |
| 2017/0201882 A1* | 7/2017 | O'Gorman | H04L 63/083 |
| 2018/0025190 A1* | 1/2018 | Vechvittayakhlung | G06K 7/10366 340/10.1 |
| 2018/0300769 A1* | 10/2018 | Kim | G06Q 50/01 |

* cited by examiner

PROVIDING CONTENT FROM MOBILE DEVICES TO PROXIMATE KIOSK COMPUTERS

BACKGROUND

Retailers employ sales associates who routinely interact with prospective customers in an attempt to sell various goods. These sales associates often are equipped with mobile devices, such as mobile phones and tablets, to facilitate their interactions with prospective customers. For instance, sales associates may use the mobile devices to access information about products that may be of interest to prospective customers. A sales associate and a prospective customer may together view images displayed on a mobile device.

BRIEF DESCRIPTION OF THE DRAWINGS

Various examples will be described below referring to the following figures.

DETAILED DESCRIPTION

At least some examples disclosed herein are directed to methods and systems for providing content (e.g., commercial content, where "commercial content" is broadly defined as any content of a commercial nature) from mobile devices to the most proximate of multiple kiosk computers in a commercial setting. For example, an electronics retailer may erect multiple kiosk computers in its brick-and-mortar store, and each kiosk computer may broadcast a beacon signal (e.g., a Bluetooth signal). When a sales associate identifies content on her mobile device that she wishes to display on a larger kiosk computer display (for instance, to facilitate discussions with a prospective customer), she may select an icon on the graphical user interface of her mobile device, and such selection of the icon may cause the mobile device to identify all available kiosk computer beacon signals in the store. The mobile device may identify the beacon signal with the greatest signal strength (e.g., using Received Signal Strength Indicators (RSSI)), which corresponds to the kiosk computer that is most proximate to the mobile device, and it may then provide the content to the most proximate kiosk computer. To provide the content to the most proximate kiosk computer, the mobile device may upload the content to the kiosk computer; it may upload the content to a remote server (e.g., in a location other than the store or somewhere within the store but physically separate from the proximate kiosk computer) and send a location descriptor to the proximate kiosk computer so that the proximate kiosk computer may access the content; it may direct the kiosk computer to another location where the content is stored (e.g., via a universal resource locator); or it may stream the content to the kiosk computer through, e.g., a Wi-Fi/802.11x connection. The remainder of this disclosure assumes that the content provided from a mobile device to a kiosk computer comprises commercial content, but the scope of disclosure is not limited as such. The various examples described herein may be implemented using any suitable type of content, including non-commercial content.

Figure 1:
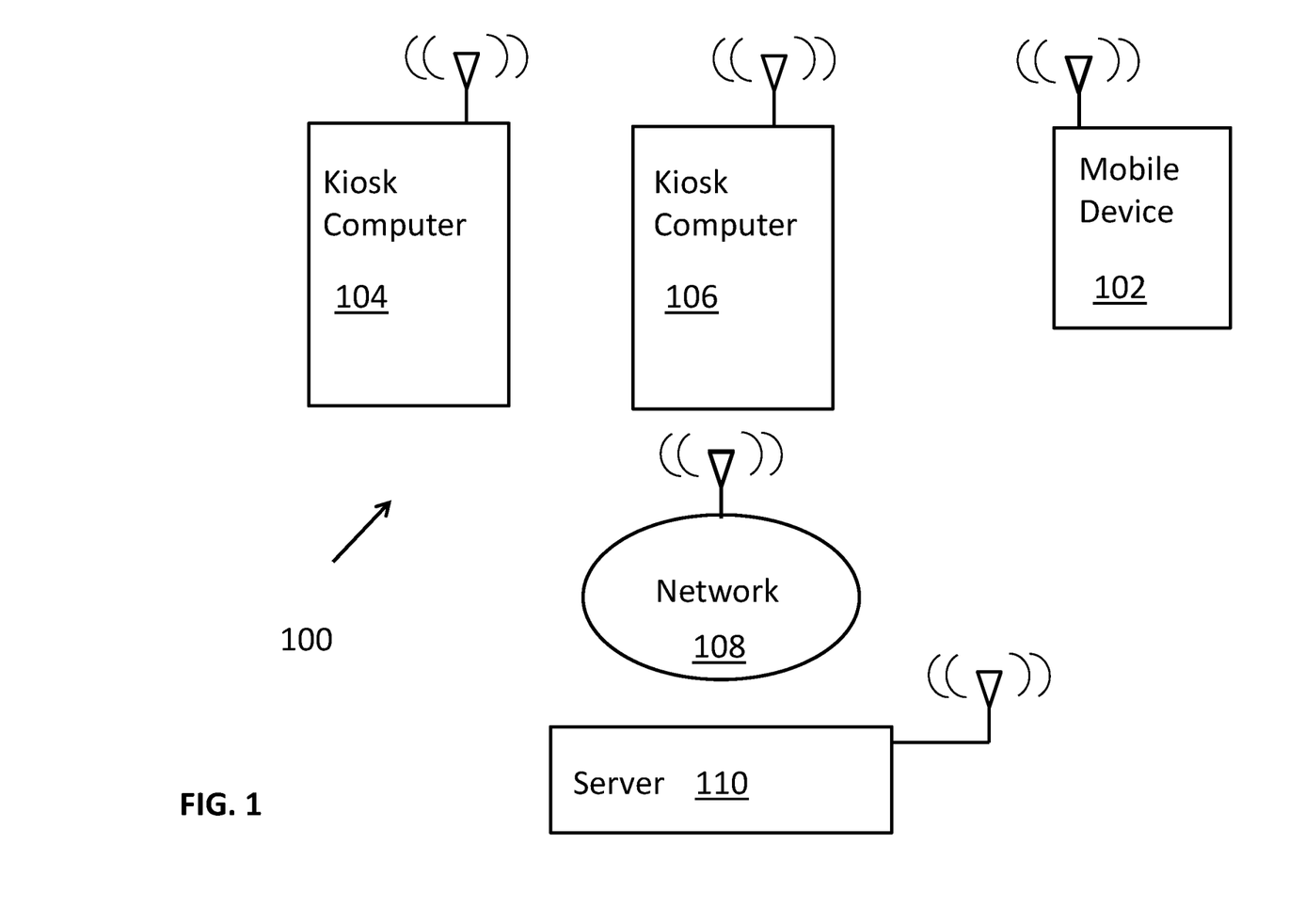
FIG. 1 is a block diagram of an illustrative commercial system including multiple kiosk computers and a mobile device communicating with a server via a network.

FIG. 1 is a block diagram of an illustrative commercial system 100 including multiple kiosk computers 104 and 106 and a mobile device 102, each of which may communicate with a server 110 via a network 108. The system 100 may be entirely contained within a single location, such as a retail store, or it may be distributed among multiple locations—for instance, a retail store and a server farm. The kiosk computers 104 and 106, in some examples, comprise displays built into or coupled to cases that house various types of hardware, such as processors and memory, which are described in greater detail below. In some examples, some or all hardware—other than displays—is housed within the kiosk case such that it is shielded from view. Although FIG. 1 only depicts two kiosk computers, any number of kiosk computers may be used. The network 108 may comprise the Internet, a local network, some other type of network, or a combination thereof. The server 110 may be local to the retail store within which the kiosk computers 104 and 106 are housed, or it may be remotely located—for instance and as mentioned above, on a server farm in another city. The operation of the system 100 is described below in tandem with the flow diagram of FIG. 5.

Figure 2:
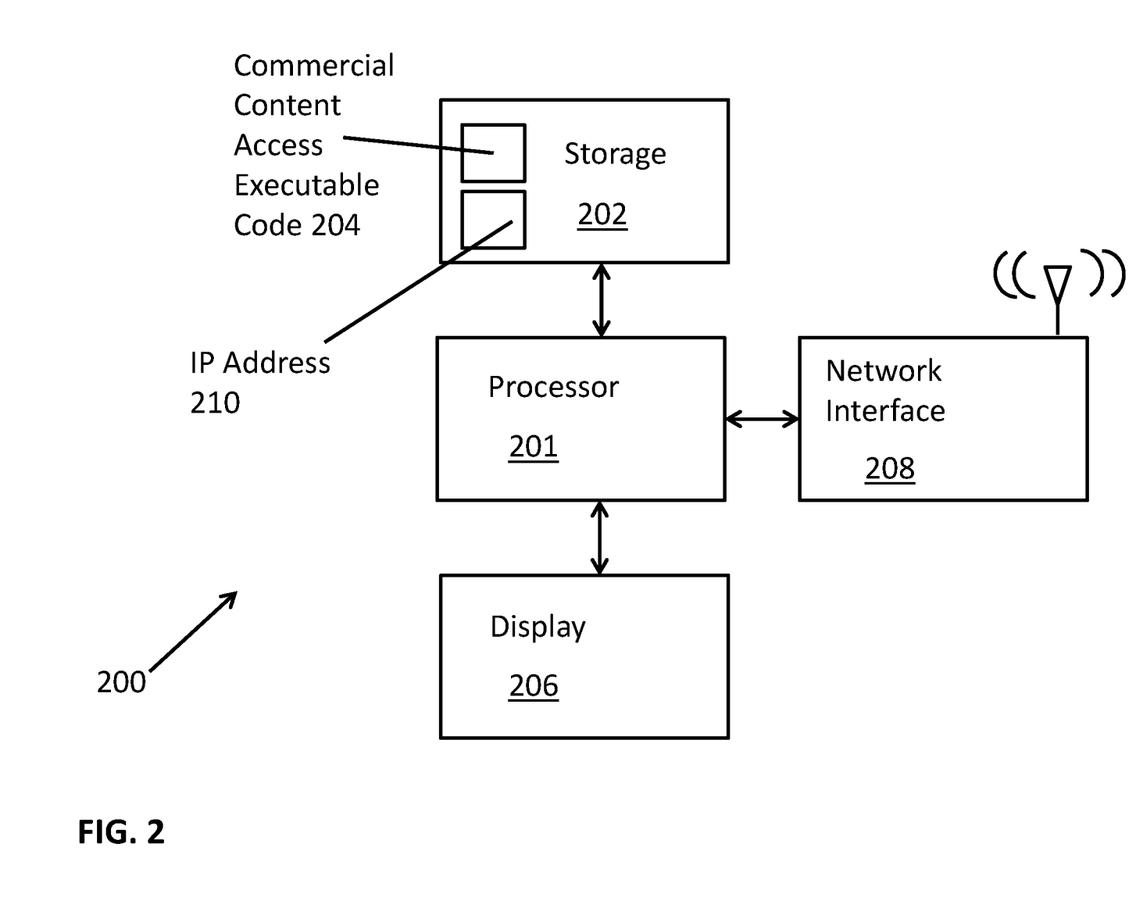
FIG. 2 is a block diagram of an illustrative kiosk computer.

FIG. 2 is a block diagram of the contents of an illustrative kiosk computer 200. The kiosk computer 200 may be representative of the kiosk computers 104 and/or 106 depicted in FIG. 1. The kiosk computer 200 may include a processor 201, storage 202 that comprises a non-transitory, machine-readable storage medium (e.g., random access memory (RAM), read only memory (ROM)) storing commercial content access executable code 204, a display 206, and a network interface 208. The kiosk computer 200 also may include other components not specifically depicted or described herein. The processor 201 executes the executable code 204, which causes the processor 201 to perform one or more of the functions attributed herein to the kiosk computer 200 (and, by extension, to any of the kiosk computers depicted in or described with regard to FIG. 1). For example, the processor 201 may execute the executable code 204 to broadcast beacon signals, to communicate with mobile devices, and to locate, access, and/or display commercial content (e.g., on the display 206).

The display 206 may be sufficiently large that it facilitates simultaneous viewing by multiple people (e.g., a sales associate and one or more prospective customers). For instance, in some examples, the display 206 has a diagonal length of at least 30 inches. In some examples, the display 206 has a diagonal length of at least 42 inches. The scope of this disclosure is not limited to any particular kiosk computer display size. In some examples, the kiosk computer is interactive and thus the display 206 may comprise a touch-screen display. In addition to storing the executable code 204, the storage 202 may store other types of information, such as an Internet Protocol (IP) address 210 associated with the kiosk computer 200.

The network interface 208 facilitates communications between the processor 201 and computers with which the processor 201 may communicate via a network—for example, remotely-located servers accessed via the Internet or sales associates' mobile devices accessed via a local wireless network. In some examples, the network interface 208 is able to support multiple communication protocols, such as Bluetooth, Wi-Fi/802.11x and Ethernet. In some examples, the network interface 208 comprises multiple sub-interfaces, each of which is able to support a different communication protocol. All such variations are contemplated and fall within the scope of this disclosure.

Figure 3:
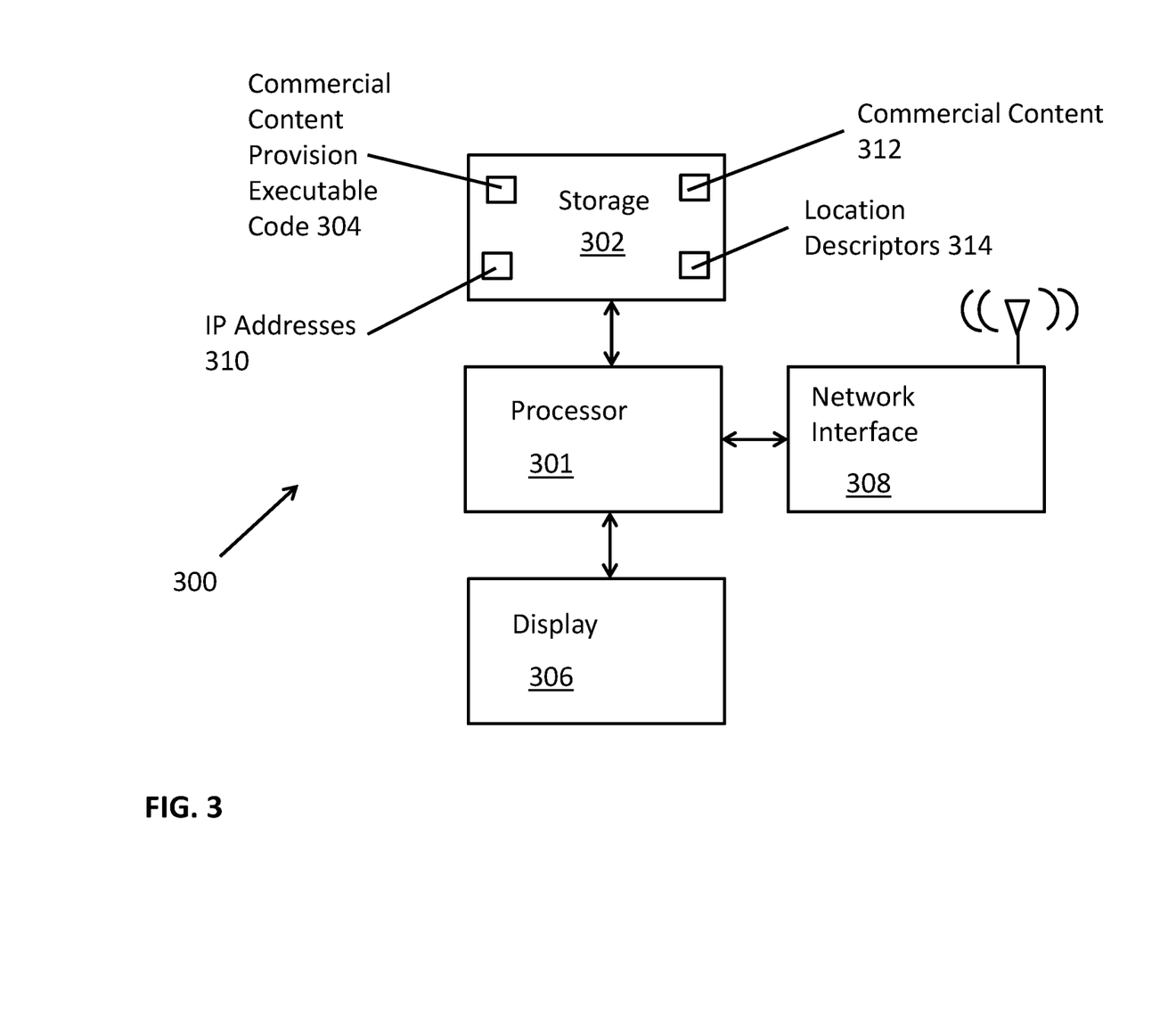
FIG. 3 is a block diagram of an illustrative mobile device.

FIG. 3 is a block diagram of an illustrative mobile device 300. The mobile device 300 may include, for example, a tablet (e.g., an IPAD®), a mobile phone (e.g., an (PHONE®), a laptop computer, a smart watch, an augmented reality device (e.g., GOOGLE® GLASS®), or another suitable type of mobile device. The mobile device 300 may be representative of the mobile device 102 of FIG. 1. The mobile device 300, in some examples, comprises a processor 301, storage 302 that comprises a non-transitory, machine-readable storage medium (e.g., RAM, ROM) storing commercial content provision executable code 304, a display 306, and a network interface 308. The processor 301 executes the executable code 304, which may cause the processor 301 to perform one or more of the actions attributed herein to the mobile device 300. For instance, executing the executable code 304 may cause the processor 301 to detect beacon signals from kiosk computers, communicate with kiosk computers, and provide commercial content to the kiosk computers, whether directly or indirectly. The storage 302 may store information other than the executable code 304, such as IP addresses 310 associated with kiosk computers as specified in beacon signals, commercial content 312 to be provided to kiosk computers, and location descriptors 314 associated with commercial content that is stored apart from the storage 302. The display 306 may be of any suitable size and type, including a touchscreen display. The network interface 308 may support one or more communication protocols, such as Bluetooth and Wi-Fi/802.11x. In some examples, the network interface 308 comprises multiple sub-interfaces, each of which supports a different communication protocol.

Figure 4:
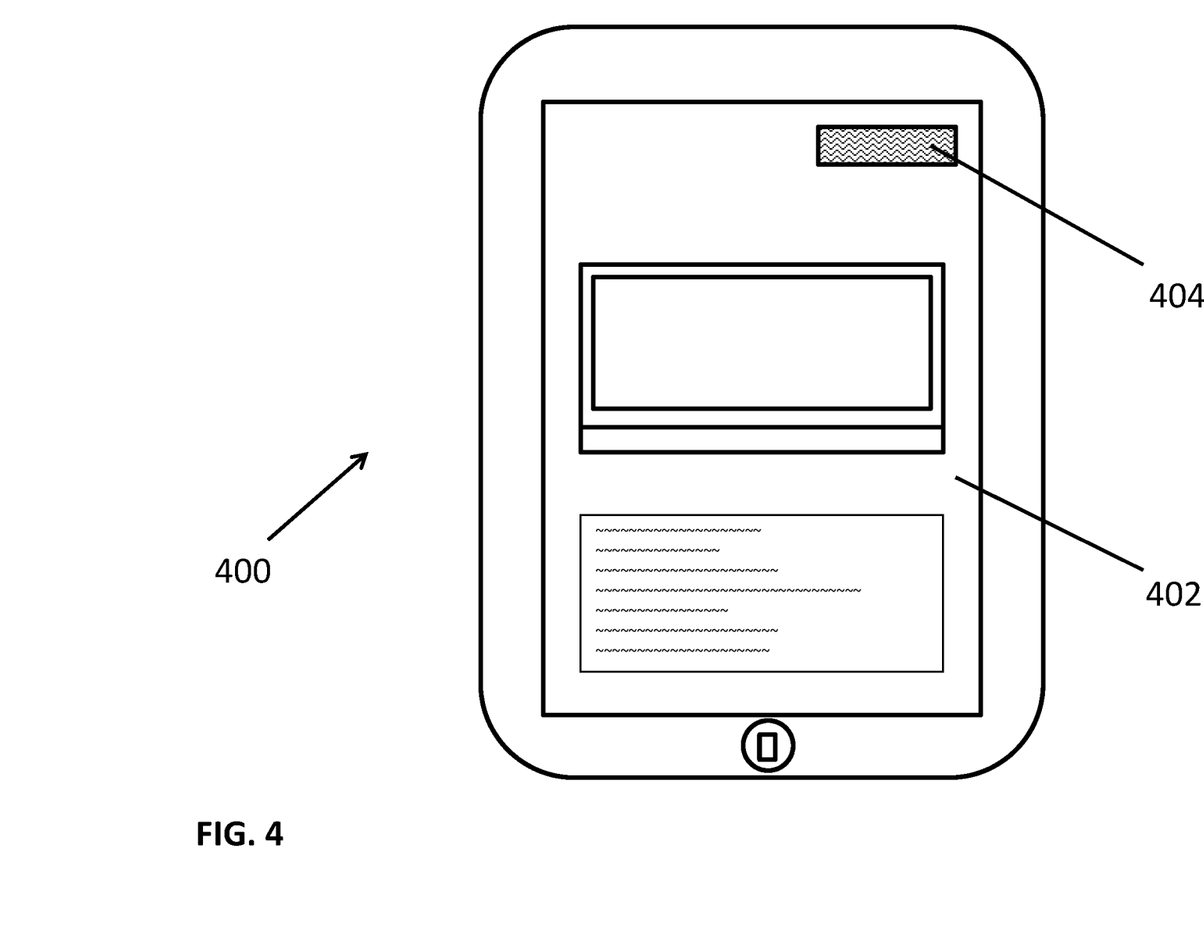
FIG. 4 depicts an illustrative graphical user interface of a mobile device.

FIG. 4 depicts an illustrative graphical user interface (GUI) 402 of a mobile device 400. The mobile device 400 may be a device (e.g., an IPAD) carried by a retail sales associate while on the sales floor meeting with prospective customers, for example. The sales associate may view various types of information on the GUI 402, such as product information, photo galleries, and the like. The sales associate may access such information using, e.g., a Wi-Fi connection with the retail store's wireless access point and router. If the sales associate accesses and views commercial content on the GUI 402 and determines that she would like to share the commercial content with a prospective customer (or other individual) in an easy-to-view manner, the sales associate may tap the icon 404. Tapping the icon 404 causes the processor of the mobile device 400 to perform certain actions. For example, the processor of the mobile device 400 may begin attempting to locate kiosk computer beacon signals, establish communications with kiosk computers via Bluetooth, Wi-Fi or some other communication protocol, and provide the commercial content displayed on the GUI 402 to the most proximate of the kiosk computers from which the processor detects a beacon signal. Other techniques for initiating communications with the most proximate kiosk computer are contemplated. For example, mobile devices with voice-activated command systems (e.g., APPLE® SIRI®) may be orally instructed to initiate communications with a kiosk computer. In the event that the mobile device 400 comprises an augmented reality device, the sales associate may make a specific gesture or series of gestures that causes the mobile device to communicate with a kiosk computer.

Figure 5:
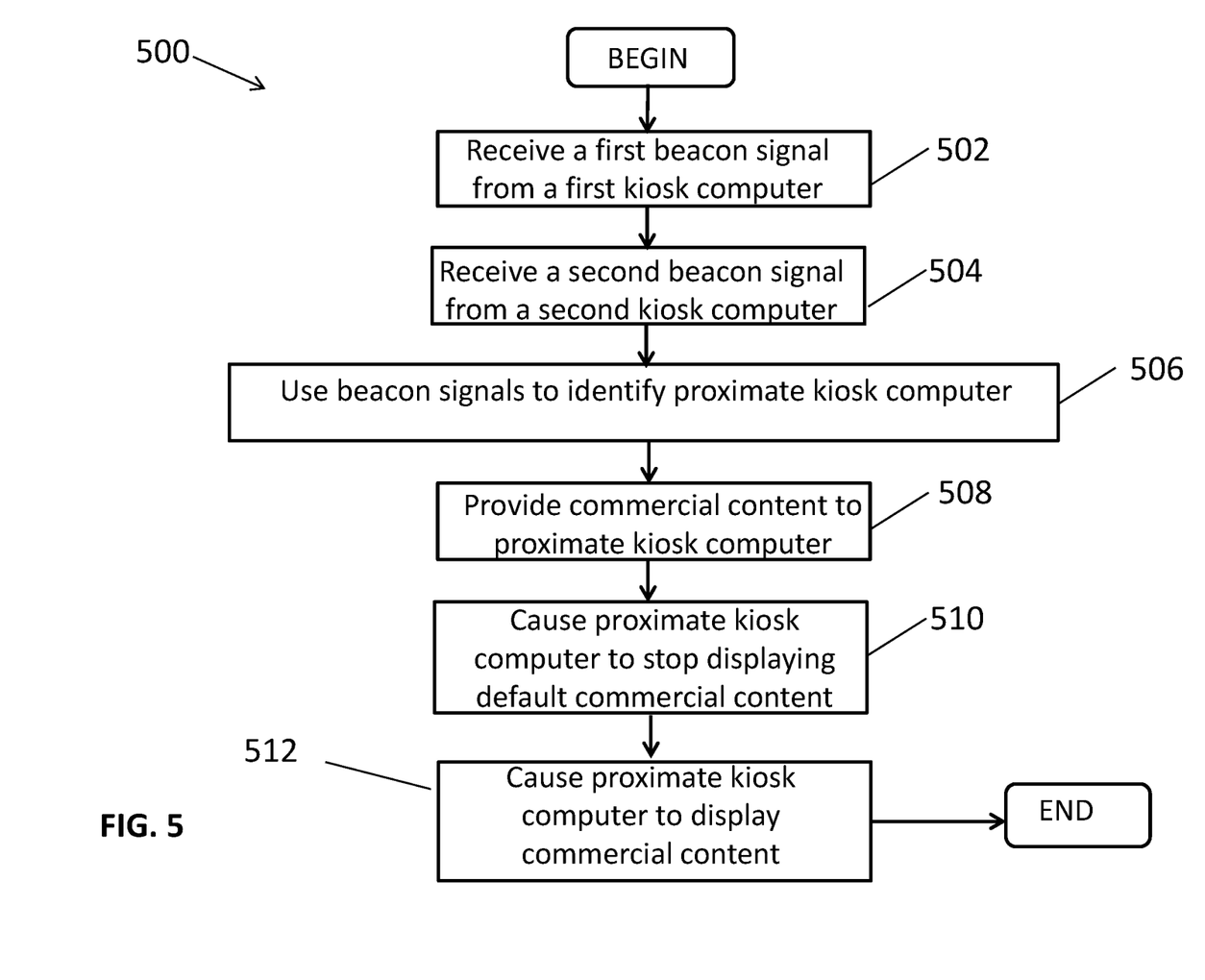
FIG. 5 is a flow diagram of an illustrative method.

FIG. 5 is a flow diagram of an illustrative method 500 in accordance with various examples. The method 500 is described in context of FIG. 1, and it may be performed by the mobile device 102. Prior to the beginning of the method 500, the kiosk computers 104 and 106 may display default commercial content. Other types of default content may be displayed, such as television shows, sports, landscape slideshows, wildlife photography, or a blank screen.

In at least some examples, performance of the method 500 is triggered when a user, such as a sales associate, instructs the mobile device 102 to provide commercial content to a kiosk computer—for example, by only tapping an icon 404 (FIG. 4). The method 500 may begin with the mobile device 102 receiving a first beacon signal from a first kiosk computer (step 502) and a second beacon signal from a second kiosk computer (step 504). As explained, in at least some examples such beacon signals are Bluetooth signals, but they are not limited as such. Further, the beacon signals may include any suitable information, such as the IP address or other identifying information associated with the kiosk computer broadcasting the beacon signals. The method 500 is not limited to receiving beacon signals from only two kiosk computers. Beacon signals may be received from any number of kiosk computers. Furthermore, in at least some examples, only those kiosk computers that are both operational and available (i.e., not being used) may broadcast beacon signals for receipt by mobile devices. Any kiosk computer broadcasting a beacon signal may cease broadcasting the beacon signal immediately if the kiosk computer becomes non-operational, if the kiosk computer begins the process of displaying commercial content from a mobile device, or if the kiosk computer is otherwise unavailable to display commercial content from the mobile device 102. In at least some examples, kiosk computers 104 and 106 are continuously broadcasting beacon signals unless a predetermined criteria has been met that precludes such continuous broadcasting (e.g., damaged kiosk computers or kiosk computers that are otherwise occupied).

The method 500 may next include the mobile device 102 using the first and second beacon signals to identify which of the first and second kiosk computers is the more proximate kiosk computer (step 506). Specifically, the mobile device 102 may receive the beacon signals and may determine the signal strength associated with each of the beacon signals (e.g., using RSSI or the signal-to-noise ratio (SNR) associated with each beacon signal). For example, the mobile device 102 may determine that the beacon signal from the kiosk computer 106 is stronger than that from the kiosk computer 104. This may be due to the lesser distance between the kiosk computer 106 and the mobile device 102 relative to the distance between the kiosk computer 104 and the mobile device 102. The mobile device 102 may determine the signal strength for each detected beacon signal. Based on such determinations, the mobile device 102 may identify the beacon signal with the greatest strength and designate the IP address associated with that beacon signal as belonging to the most physically proximate kiosk computer. For example, referring to FIG. 1, the mobile device 102 may determine that the strength of the beacon signal broadcast by the kiosk computer 106 is greater than the strength of the beacon signal broadcast by the kiosk computer 104, and, as a result, the mobile device 102 may designate the IP address contained in the beacon signal of kiosk computer 106 as that of the most proximate kiosk computer.

After the mobile device 102 identifies the proximate kiosk computer (e.g., kiosk computer 106), the mobile device 102 may provide the proximate kiosk computer with commercial content for display (step 508). The commercial content provided may include commercial content currently displayed on the GUI of the mobile device 102 (e.g., GUI 402 of mobile device 400 in FIG. 4). Alternatively, the commercial content provided may include commercial content known to the sales associate but not displayed on the GUI. To provide the commercial content, the mobile device 102 may stream the commercial content to the proximate kiosk computer via, e.g., a Wi-Fi connection and the IP address received in the beacon signal. Alternatively, to provide the commercial content, the mobile device 102 may upload the content to the proximate kiosk computer via, e.g., a Wi-Fi connection and the received IP address, and the upload may be fully or at least partially completed prior to playback by the kiosk computer. Alternatively, to provide the commercial content, the mobile device 102 may upload the content to another computer, such as a server, and it may provide the proximate kiosk computer with a location descriptor so that the proximate kiosk computer may access the commercial content from that computer. For instance, the location descriptor may be an IP address or uniform resource locator (URL) associated with a server to which the commercial content has been uploaded. Alternatively, to provide the commercial content, the mobile device 102 may transmit a URL to the proximate kiosk computer directing the proximate kiosk computer to a server that already has the commercial content stored thereupon. In at least some examples, communications from the mobile device 102 to the proximate kiosk computer use the JavaScript Object Notation (JSON) format, although other protocols are contemplated.

In at least some embodiments, the mobile device 102 communicates with kiosk computers, including the proximate kiosk computer, via a dedicated kiosk computer port that is designated for communications with mobile devices. Through such a port, the kiosk computer may receive instructions, location descriptors, and other relevant information from the mobile device 102. The kiosk computer, such as the proximate kiosk computer, also may designate a separate port for the receipt of commercial content. Using such ports, as well as instructions and/or location descriptors received from the mobile device in response to the broadcast of a beacon signal, the kiosk computer may access the commercial content.

The method 500 comprises the mobile device 102 causing the more proximate kiosk computer to stop displaying default commercial content (step 510), such as the aforementioned types of default commercial content (e.g., television shows, wildlife photography). The method 500 then comprises the mobile device 102 causing the proximate kiosk computer to display the commercial content (step 512) in lieu of any default content that may be displayed, and the sales associate and prospective customer may interact with the displayed commercial content as desired. The method is then complete. The method 500 may be adjusted as desired, including by adding, deleting, modifying, or rearranging one or more steps. After the sales associate and prospective customer have finished using the proximate kiosk computer, the sales associate may tap the icon 404 (FIG. 4) to end the commercial content display. At that time, the proximate kiosk computer may resume displaying the default content (e.g., default commercial content).

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A system comprising:
a first kiosk computer to display first content and to broadcast a first beacon signal;
a second kiosk computer to display second content and to broadcast a second beacon signal; and
a mobile device to establish communications with a more proximate of the first and second kiosk computers as determined based on the first and second beacon signals and to cause new content to be provided to the more proximate kiosk computer, wherein the mobile device is an augmented reality device and is to establish the communications;
wherein the more proximate kiosk computer is to display the new content,
wherein, to provide the new content to the more proximate kiosk computer, the mobile device is to upload the new content to a server that is accessible to the more proximate kiosk computer and is to transmit a location descriptor describing a location at which the new content is stored and which is accessible to the more proximate kiosk computer, and
wherein the mobile device is to display an icon, and wherein the mobile device is to provide the new content to the more proximate kiosk computer in response to user selection of the icon and without additional input from the user other than selection of the icon.

2. The system of claim 1, wherein the more proximate kiosk computer is to display the new content in lieu of the first or second content.

3. The system of claim 1, wherein, to provide the new content to the more proximate kiosk computer, the mobile device is to stream the new content to the more proximate kiosk computer via a wireless connection.

4. The system of claim 1, wherein the mobile device is to determine a first signal strength of the first beacon signal and a second signal strength of the second beacon signal and to determine which of the first and second signal strengths is greater, and wherein the mobile device is to designate as the more proximate of the first and second kiosk computers the kiosk computer emitting the beacon signal with the greater signal strength.

5. A system comprising:
a first processor;
a non-transitory, machine-readable storage medium coupled to the first processor and storing executable code;
a network interface, coupled to the first processor, to receive new commercial content from a computer; and
a display, coupled to the first processor, to display default commercial content and the new commercial content,
wherein execution of the executable code causes the first processor to:
display the default commercial content on the display;
cause a beacon signal to be emitted, the beacon signal including an Internet Protocol (IP) address associated with the first processor;
receive a location descriptor describing access information associated with the computer from a mobile device, wherein the mobile device provides the location descriptor to the first processor responsive to uploading the new commercial content to the computer;
access the new commercial content from the computer via the network interface using the access information; and display the new commercial content on the display in lieu of the default commercial content, and wherein the first processor is to execute the executable code responsive to receipt of a signal indicating a user of the mobile device selected an icon on the mobile device and provided no other user input to effect the execution, and wherein execution of the executable code causes the processor to stop displaying the new commercial content on the display and to resume displaying the default commercial content responsive to receipt of another signal indicating the user of the mobile device again selected the icon and provided no other user input to stop the display of the new commercial content and to resume display of the default commercial content.

6. The system of claim 5, further comprising a second processor to cause a second beacon signal to be emitted, wherein the mobile device is to determine which of the first processor and the second processor is more proximate to the mobile device based on strengths of the beacon signal and the second beacon signal, and wherein the mobile device provides the location descriptor to the first processor as a result of the first processor being more proximate to the mobile device than the second processor.

7. The system of claim 5, wherein the beacon signal comprises a Bluetooth signal.

8. The system of claim 5, wherein the first processor is to receive the location descriptor via a Wi-Fi connection.

9. A method comprising:
receiving a first beacon signal from a first kiosk computer;
receiving a second beacon signal from a second kiosk computer;
responsive to a first user selection of an icon displayed on a mobile device and without additional user input:
using the first and second beacon signals to determine which of the first and second kiosk computers is more proximate to the mobile device;
providing commercial content to the more proximate kiosk computer by uploading the commercial content to a server that is accessible to the more proximate kiosk computer;
causing the more proximate kiosk computer to cease displaying default commercial content; and
causing the more proximate kiosk computer to display the commercial content; and
responsive to a second user selection of the icon and without additional user input, causing the more proximate kiosk computer to stop display of the commercial content.

10. The method of claim 9, further comprising providing a location descriptor associated with the commercial content to the more proximate kiosk computer.

11. The method of claim 9, further comprising uploading the commercial content to the more proximate kiosk computer.

12. The method of claim 9, further comprising causing the more proximate kiosk computer to resume displaying the default commercial content.

* * * * *